United States Patent [19]

Cipriano

[11] Patent Number: 5,085,955

[45] Date of Patent: Feb. 4, 1992

[54] NON-AQUEOUS ELECTROCHEMICAL CELL

[75] Inventor: Robert A. Cipriano, Lake Jackson, Tex.

[73] Assignee: The Dow Chemical Company, Midland, Mich.

[21] Appl. No.: 616,974

[22] Filed: Nov. 21, 1990

[51] Int. Cl.⁵ ............................................. H01M 6/14
[52] U.S. Cl. .................................... 429/197; 429/102; 429/218; 29/623.5
[58] Field of Search ............... 429/194, 197, 218, 101, 429/102, 112; 427/115; 29/623.5

[56] References Cited

U.S. PATENT DOCUMENTS 4,877,695 10/1989 Cipriano et al. ..................... 429/102
4,886,715 12/1989 McCullough, Jr. et al. ........ 429/103

Primary Examiner—Anthony Skapars

[57] ABSTRACT

An electrochemical cell comprising an anode composed of a substrate having a mixture of non-lithium alkali metals, a cathode comprising an electrically conductive carbonaceous material and an electrolyte comprising an electrolyte salt and a non-aqueous solvent. The anode is provided with a skin or coating of an alkali metal.

19 Claims, 4 Drawing Sheets

NON-AQUEOUS ELECTROCHEMICAL CELL

FIELD OF THE INVENTION

The present invention relates to an improved non-aqueous electrochemical cell which has a high discharge capacity, high discharge efficiency and excellent size stability. More particularly, the invention is concerned with an improvement in non-aqueous electrochemical cells using as the active anode material a molten non-lithium mixture of alkali metals which provides an increase in energy and power density, and their preparation.

BACKGROUND OF THE INVENTION

A non-aqueous electrochemical cell using lithium as an active anode material has high energy density, good storage characteristics and wide operation temperature range. A non-aqueous electrochemical cell is therefore often used as a power source for a calculator, a watch or a memory back up system. Such a cell comprises an anode, an electrolyte and a cathode. In general, such a cell uses as an anode an alkali metal such as lithium or sodium; as an electrolyte or electrolytic solution, a solution of a solute such as lithium perchlorate or lithium tetrafluoroborate in a non-aqueous solvent such as propylene carbonate, γ-butyrolactone or diglyme; and as a cathode, manganese dioxide or polycarbonmonofluoride.

The combination of relatively high theoretical energy density, potentially long life, and low cost materials such as reported in the sodium-sulfur system high temperature batteries is suitable primarily for low rate performance work such as electric road vehicle propulsion or load leveling of electric power supplies. The sodium-sulfur systems, first proposed in 1966, have had a great deal of effort expended in trying to develop a practical system. The basic operating principle involves the separation of two active molten materials, sodium and sulfur, by either a ceramic membrane of beta alumina or sodium glass, which at about 300° C. or higher allows the passage of sodium ions that form with the sulfur any of the several polysulfides. The open circuit voltage of the system is at just over 2 volts, about the same as the lead-acid cell. Two formidable problems exist at the present time, viz., cracking of the separator and corrosion of the casing and seal.

Another somewhat similar system is the lithium-iron sulfide system, operating at about 450° C. However, insufficient development has been done to date to demonstrate the widespread practicality of this system.

Another of the developments being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride potassium chloride system. Because of the high melting point of such salts, such cells must be operated in the temperature range of 400–500 degrees centigrade.

This requirement to operate at such high temperatures has several important disadvantages. One of these is that various degradation processes, such as corrosion of the cell container, seals, and other components are accelerated by such high temperatures. Another is that a substantial amount of energy is lost through heat transfer to the surroundings. Still another is that the voltage obtained from such cells is lower at elevated temperatures, due to the fundamental property of the negative temperature dependence of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage the cell components.

Cells involving a lower temperature molten salt electrolyte have been investigated where the molten salt is based upon a solution of aluminum chloride and an alkali metal chloride. However, the soluble positive electrode materials are not stable in the presence of the respective alkali metals. As a result, an auxiliary solid electrolyte must be used to separate the alkali metal and the counter electrode. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant. Such a cell can operate in the temperature range of 150–250 degrees centigrade. It has the disadvantage of having to employ an electrolyte, which increases the cell impedance, as well as adding to the cost and complexity.

U.S. Pat. No. 3,844,837 to Bennion et al discloses a non-aqueous battery in which the anode may be lithium and/or graphite on which lithium metal is deposited and as a positive electrode a platinum cup filled with powdered $K_2SO_4$ and graphite is utilized. The electrolytes disclosed are $LiClO_4$, $LiCF_3SO_3$ or $LiB_4$ dissolved in dimethyl sulfite.

U.S. Pat. No. 4,877,695 discloses a non-aqueous electrochemical cell for use in primary rechargeable storage devices in which the cathode comprises an electrically conductive carbonaceous material, the anode is a molten mixture of two elements selected from the group consisting of sodium, potassium, cesium and rubidium, and the electrolyte comprises a solvent and an electrolyte salt selected from the group consisting of an alkali metal tetrafluoroborate and a tetraalkylammonium tetrafluoroborate. The present invention provides a specific improvement in the electrochemical cell of the patent by increasing its energy and power density.

U.S. Pat. No. 4,886,715 discloses a primary rechargeable energy storage device comprising an anode which is an alkaline earth or alkali metal and a carbonaceous fiber cathode. The electrolyte is a membrane comprising lithium laurate.

SUMMARY OF THE INVENTION

In accordance With the present invention there is provided an improved non-aqueous electrochemical cell for use in primary rechargeable storage devices of the type disclosed in U.S. Pat. No. 4,877,695, which is incorporated herein by reference. The cell comprises a pair of electroconductive electrodes electrically insulated from contact, a solid electrolyte and an organic electrolyte solvent which is suitable for use in batteries.

More particularly, the invention is concerned with a non-aqueous electrochemical cell comprising an anode, a cathode and a non-aqueous electrolyte, wherein the anode comprises a mixture of at least two elements selected from the group consisting of sodium, potassium, cesium and rubidium, and there is a skin or coating of an alkali metal over the anode.

In accordance with an embodiment of the invention, the skin or coating of an alkali metal, particularly, lithium, is deposited on the anode by initially forming the cell with an alkali metal containing electrolyte, for example, LiBF$_4$, charging the cell and then replacing the electrolyte with a fresh electrolyte of choice.

Layers of other alkali metals can be placed over the initial layer by changing the electrolyte and then charging the cell. For example, a first electrolyte can be lithium tetrafluoroborate which deposits lithium and the second electrolyte can be sodium tetrafluoroborate which deposits sodium.

The amount of alkali metal skin can range from a monolayer to an amount where classical behavior of the alkali metal, for example, lithium anode is observed. Preferably the layer(s) is in a thickness of about 0.0003 microns to 100 microns.

A further method of preparing the skin or coating is to line the anode with an alkali metal, for example lithium, and then charge the cell.

A still further method of preparing the skin or coating is by electroless deposition or plasma spraying an alkali metal on the anode.

It has been found that a smaller amount of electrolyte is necessary in the cell of the invention since some of the alkali metal, particularly lithium, required for the stoichiometry of the battery reaction is being supplied from the alkali metal deposited onto the anode surface. This decrease in volume and weight of electrolyte that is necessary to satisfy the cell stoichiometry results in a corresponding increase in energy and power density for the electrochemical cell.

The cathode or positive electrode can comprise a carbonaceous electrically conductive cloth or sheet material, graphite, a composite of graphite and an inert polymers such as polytetrafluoroethylene, or any of the conventional metal or metal oxide electrodes, for example zinc, cadmium, aluminum, nickel, platinum, etc. Preferably, the cathode comprises carbonaceous cloth or sheet material which is associated with a current collector. Advantageously, the carbonaceous material comprises an activated carbon fabric.

The anode or negative electrode comprises a substrate having a mixture of at least two elements selected from the group consisting of cesium, rubidium, potassium, and sodium and an alkali metal skin or coating. The anode can have one or more layers of the alkali metal. Preferably, the skin or coating is lithium or the total coating comprises at least about 75% by weight of lithium.

The substrate can comprise a common metallic, inorganic or organic inert polymeric matrix.

The cathode is preferably a carbonaceous cloth, felt or sheet which includes an electron collector conductively associated with the carbonaceous felt, cloth or sheet. The electrode conductor interface can be further protected by a material to insulate the collector and to substantially protect the electron collector from contact with the electrolyte and its ions. The protective material must, of course, be unaffected by the electrolyte and its ions.

The current collector intimately contacts the carbonaceous material of the electrode. The carbonaceous material can be in the form of an assembly such as a planar cloth, sheet or felt. It is also envisioned that the electrode can be constructed in other shapes such as in the form of a cylindrical or tubular bundle of fibers. It is also apparent that an electrode in the form of a planar body of cloth, sheet or felt can be rolled up with a separator between the layers of the carbonaceous material, and with the opposed edges of the rolled up material connected to a current collector. While copper metal has been used as a current collector, any electroconductive metal or can be employed, such as, for example, silver, gold, platinum, cobalt, nickel, palladium, and alloys thereof. Likewise, while electrodeposition has been used in bonding a metal or metal alloy to the carbonaceous material, other coating techniques (including melt applications) or electroless deposition methods may be employed.

Suitable techniques for preparing the collector/carbonaceous material negative electrode are more fully described in U.S. Pat. No. 4,631,116, entitled Improved Low Resistance Collector Frame for Electro-conductive Organic and Graphitic Materials, of F. P. McCullough and R. V. Snelgrove.

Preferably, the mixture of alkali metals which is utilized in fabricating the anodes of the invention are molten at ambient temperatures, so that a heating element is not required so as to make the cell operational.

The separator which is utilized in the cell of the invention may be any inert conventional separator, for example fiberglass, microporous polypropylene film such as available from Celanese Corporation under the trademark CELGARD.

The non-aqueous electrolyte system used in the invention comprises conventional solvents and electrolyte salts. Suitable solvents include 1,3-dioxolane, 1,2-dimethoxyethane, 2-methyltetrahydrofuran, diethyl ether based solvents, ethylene carbonate, propylene carbonate, γ-butyrolactone, and mixtures thereof.

Suitable electrolyte salts include the alkali salts of tetrafluoroborate, such as lithium tetrafluoroborate, sodium tetrafluoroborate and potassium tetrafluoroborate, tetraalkylammonium tetrafluoroborate, for example tetralkylammonium tetrafluoroborate and tetrabutylammonium tetrafluoroborate, alkali metal borates, alkali metal perchlorates, alkali metal hexafluoroarsenates, alkali metal hexafluorophosphates, or mixtures thereof.

BRIEF DESCRIPTION OF THE DRAWINGS

The present invention will be better understood from the following description of preferred embodiments of the invention together with the accompanying drawings wherein.

DETAILED DESCRIPTION OF THE PREFERRED EMBODIMENTS

Figure 1:
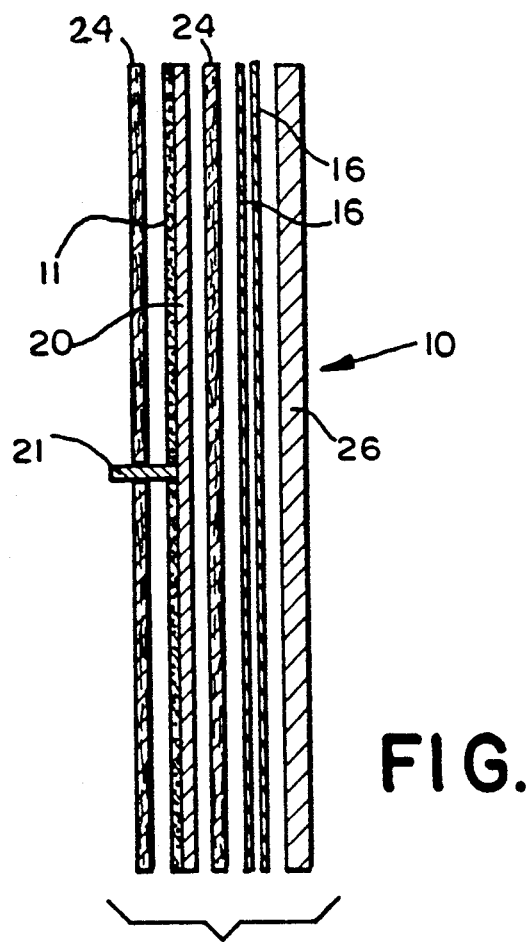
FIG. 1 is a schematic side elevational view, in cross-section, of an embodiment of the invention.

Referring to FIG. 1, a cell 10 within a housing (not shown) includes an anode assembly comprising an expanded metal matrix 11 in which the molten mixture of alkali metals for example, sodium-potassium in the molten state are retained. The anode has a lithium skin 20.

A separator 24 encloses the anode assembly with a bipolar connector 25 passing through the separator 24. The separator 24 preferably comprises a porous polymer film.

The cathode comprises a carbonaceous fiber cloth or mat 16 that is placed adjacent a bipolar plate 26, which is preferably aluminum. Preferably the cathode is a graphitic cloth having a bulk density of about 0.645 g/cc. The solvent electrolyte occupies the voids of the carbonaceous cloth 16 and the separator 24.

In order to bring the battery to its operating temperature when the anode comprises a mixture of alkali metals which are not molten at ambient temperature, or an electrolyte which is below its freezing point at ambient temperature, there is optionally provided a heater (not shown).

Figure 2:
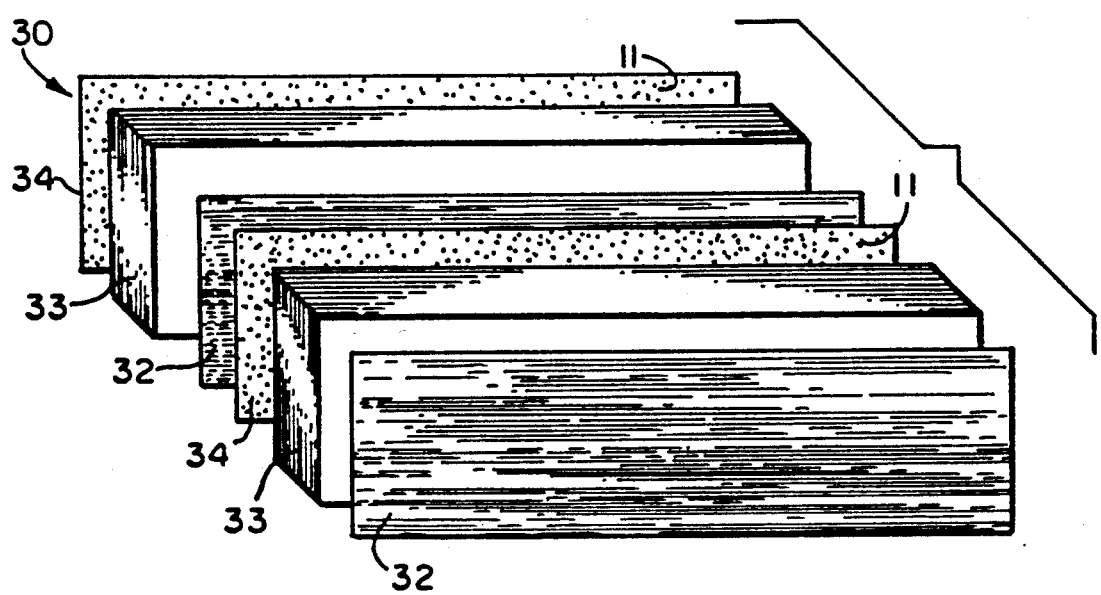
FIG. 2 is a partially broken away view of a flat plate multi-cell assembly of a battery of the invention.

FIG. 2 illustrates a multi-cell assembly 30 showing two series connected cells separated by a bipolar plate metal connector 32. It is to be understood that the assembly 30 can include any number of cell units by use of additional bipolar separators and cell units. The assembly 34 comprises a metal screen which has been coated with a molten mixture of alkali metals upon which a lithium skin 11 has been deposited.

The cathode plate 33 comprises a carbonaceous cloth electrode having a bulk density of about 0.645 g/cc. The solvent electrolyte occupies the voids of the cloth and the separator.

Surprisingly, the lithium skin on the surface of an anode comprising a sodium-potassium eutectic does not show the classic polarization phenomena associated with a pure lithium electrode. This deviation from pure lithium behavior provides the capability of higher discharge and recharge rates than for known lithium cells.

EXAMPLE

A test battery was prepared of the type described in U.S. Pat. No. 4,886,716, which is herein incorporated by reference, wherein the cathode comprised an activated carbon fiber, the anode comprised a sodium-potassium eutectic, the separator was CELGARD and the electrolyte was 29.7 percent by weight of $LiBF_4$ in ethylene carbonate. The components were all contained in a glass holder and all the experiments were conducted in an argon atmosphere.

Figure 3:
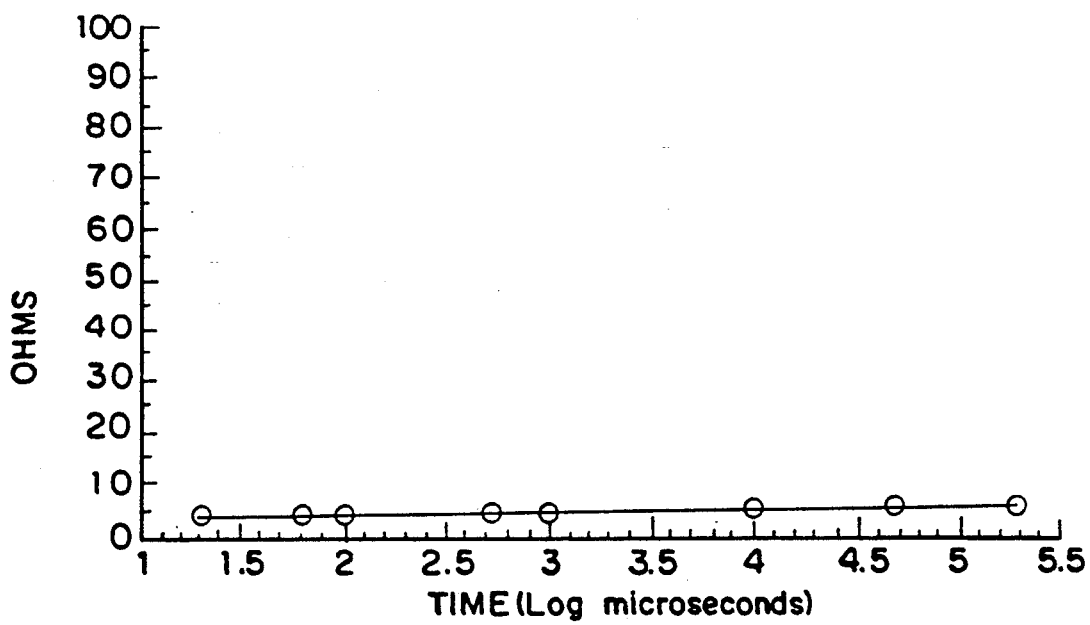
FIG. 3 is a graph of the cell resistance of the battery of the invention prior to initial discharge.

Prior to discharge, the anode composition was 29 percent by weight sodium and 71 percent by weight potassium. FIG. 3 shows the cell resistance measured as a function of cell load and time prior to the initial discharge of the battery.

Figure 4:
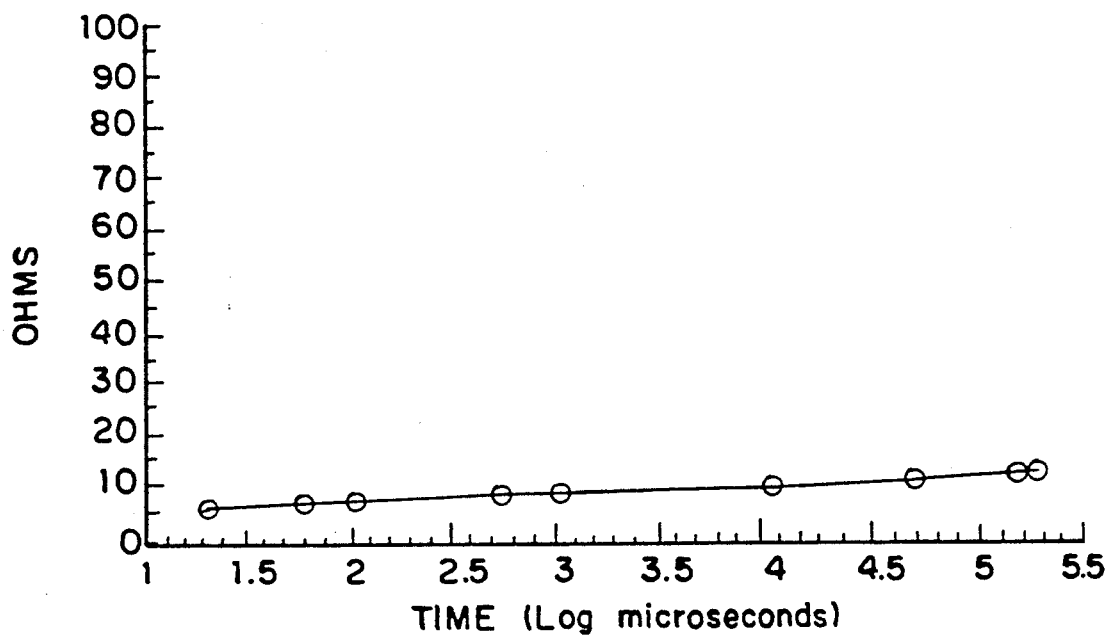
FIG. 4 is a graph of the cell resistance of the battery used for FIG. 3 after initial discharge.

FIG. 4 shows the cell resistance as measured as a function of cell load and time after an initial discharge of the battery through a 10 ohm load for ten minutes.

Figure 5:
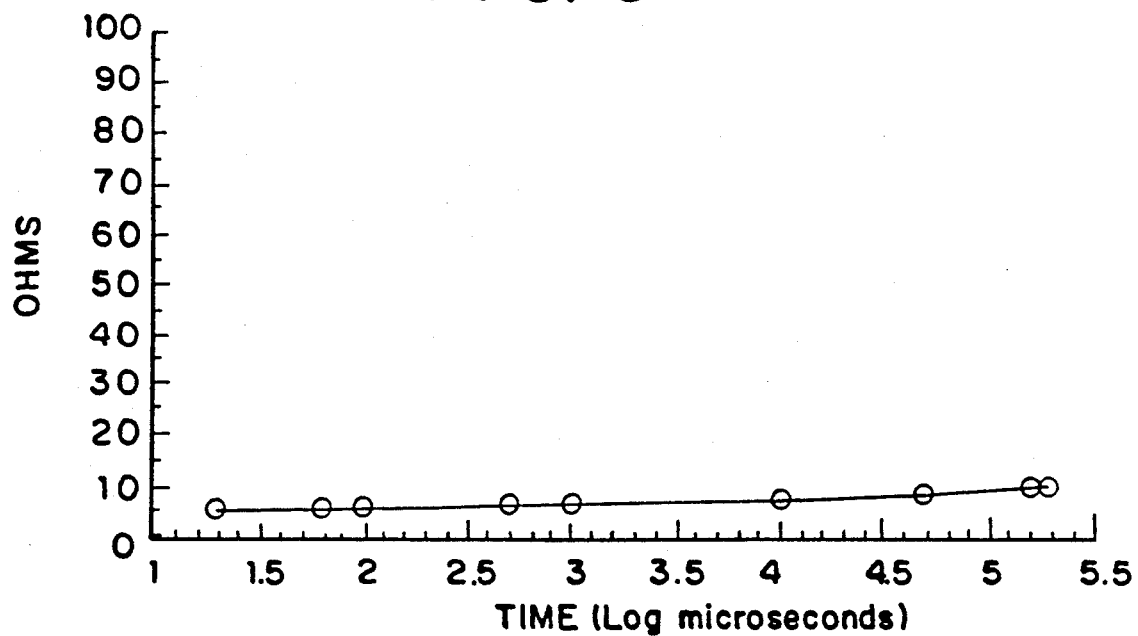
FIG. 5 is a graph of the cell resistance of the battery used in FIG. 4 after a 15.2 coulomb recharge at 3.0 volts.

FIG. 5 shows the cell resistance as a function of cell load and time after a 15.2 coulomb recharge at 3.0 volts. As noted, the cell resistance returns substantially to its pre-discharge value as a function of cell load and time after recharge whereas, the cell resistance was significantly increased over its pre-discharge value after the initial discharge.

Figure 6:
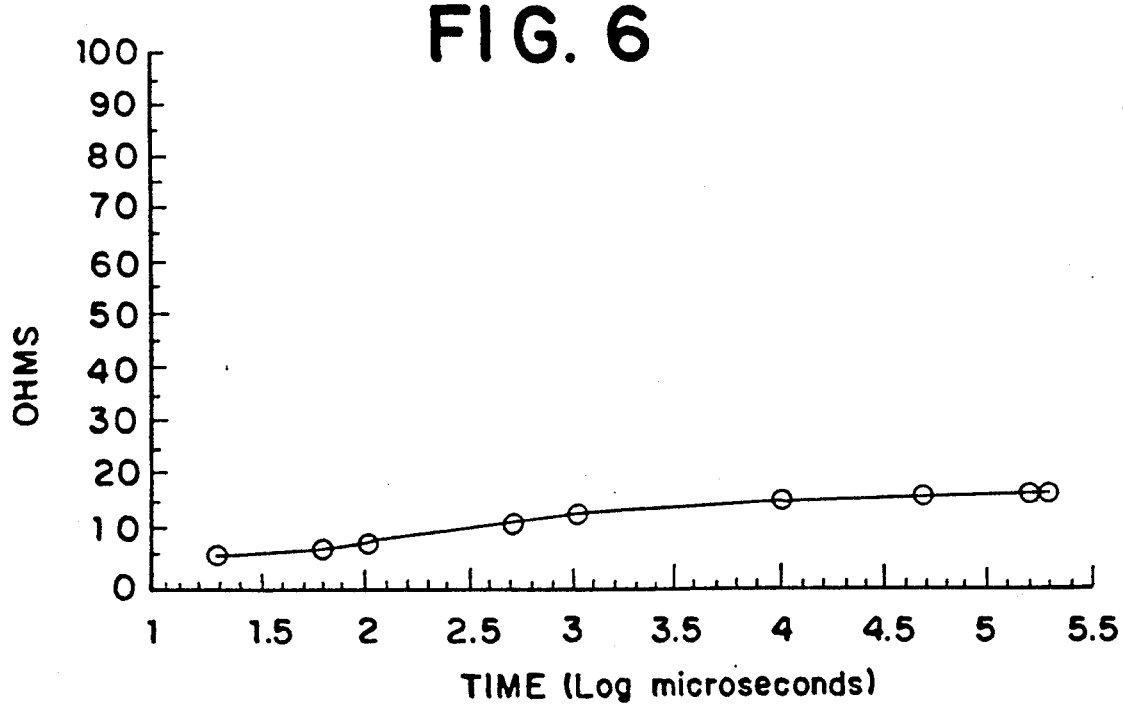
FIG. 6 is a graph of the cell resistance of the battery with a lithium metal anode prior to initial discharge.

FIG. 6 shows the cell resistance as a function of cell load and time for the same battery with a lithium anode prior to initial discharge.

Figure 7:
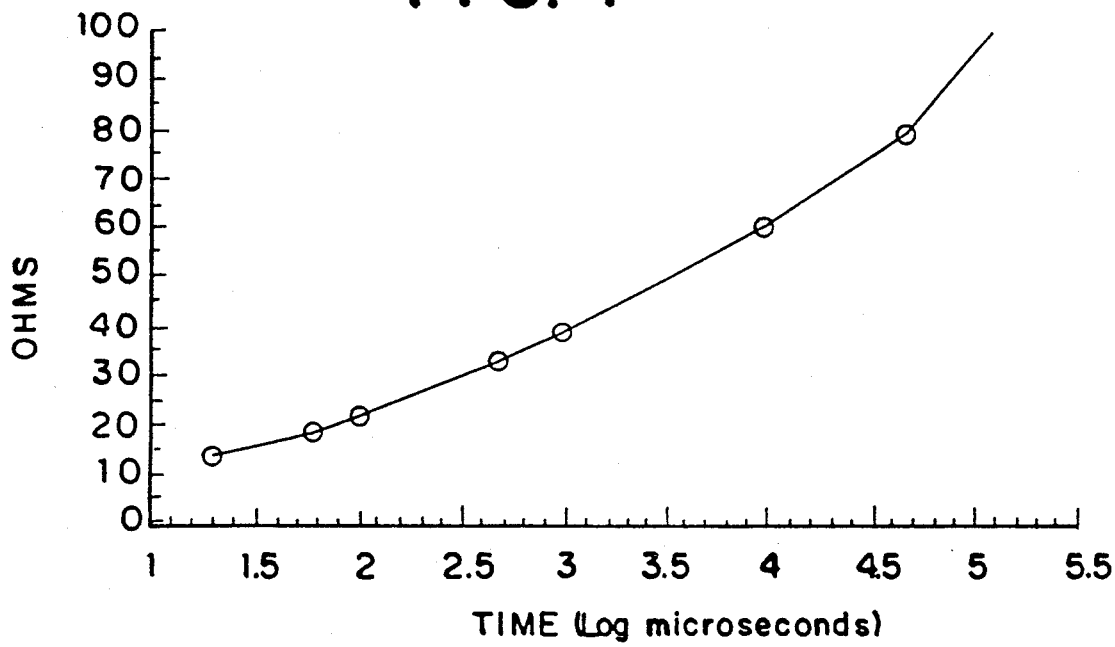
FIG. 7 is a graph of the cell resistance of the battery of FIG. 6 after initial discharge.

FIG. 7 shows that the cell resistance after a ten minute discharge through a 10 ohm load has increased dramatically over the pre-discharge value.

Figure 8:
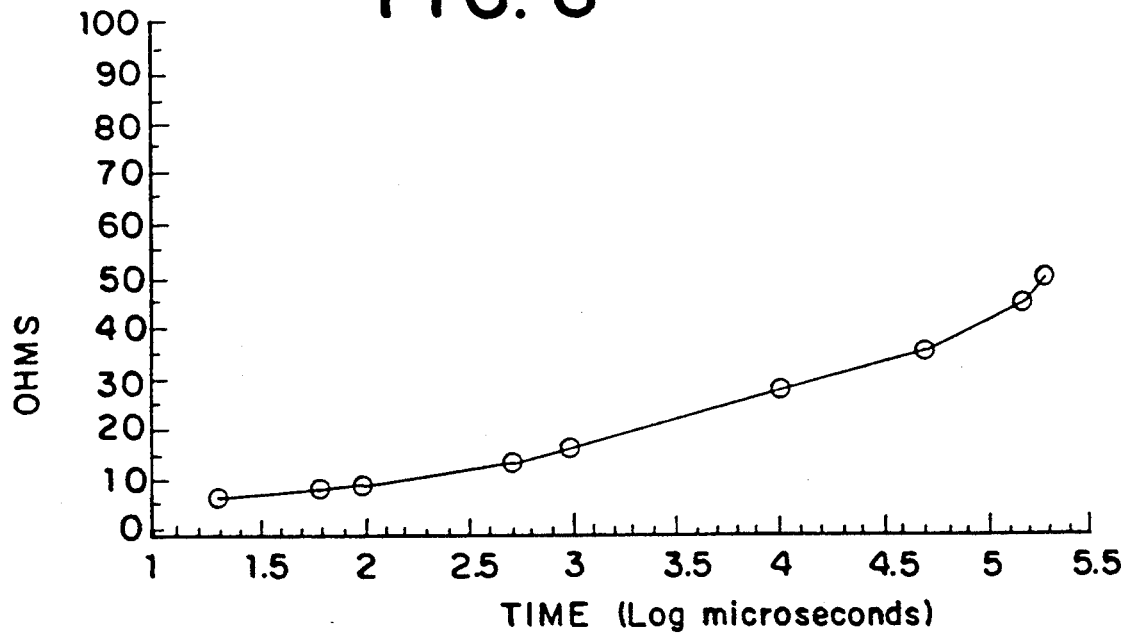
FIG. 8 is a graph of the cell resistance of the battery of FIG. 6 after a 5.04 coulomb recharge at 3.0 volts.

FIG. 8 gives the cell resistance as a function of cell load and time for the battery after a 5.04 coulomb recharge at 3.0 volts and clearly shows the cell resistance has not returned to its pre-discharge value.

Table I shows the analytical data regarding electrode composition obtained before and after discharge.

TABLE I

| | Electrode Composition | | | |
|---|---|---|---|---|
| | Na | K | Li | Comments |
| Starting material | 99.7 | 0.30 | 0.00 | unused Na |
| Starting material | 1.1 | 98.87 | 0.03 | unused K |
| Before discharge | 29.0 | 70.98 | 0.02 | unused NaK |
| After discharge | 34.6 | 59.1 | 6.3 | * |

*electrode composition after one recharge at 3.00 V with a 29.7 wt % $LiBF_4$ in ethylene carbonate electrolyte at 100° C. The data indicates that the following reactions are occurring during discharge and recharge of the electrochemical cell:
$NaK + 2e^- \rightarrow Na^+ + K^+$ anode
$2LiBF_4 + Na^+ + K^+ \rightarrow NaBF_4 + KBF_4 + 2Li^+$ electrolyte
$C_6 + e^- \rightarrow C_6^-$ cathode
$C_6^- + Li^+ \rightarrow C_6^- Li^+$ The cell stoichiometry requires one $Li^+$ for every $C_6$ repeating unit in the carbonaceous structure. The above stoichiometry shows that in the absence of a lithium metal skin on the sodium/potassium eutectic anode all the $Li^+$ required for complete utilization of the carbonaceous electrode must come from the $LiBF_4$ electrolyte. Since concentrations of only about 30 wt % $LiBF_4$ are possible in most suitable solvent systems, the addition of more solvent to obtain higher concentrations of $Li^+$ in the cell results in significant reductions in the energy and power density values.

The thickness of the lithium skin varies with the deposition time; the desired thickness being exceeded when the cell behaves as if the anode was composed of pure lithium. This can be determined via polarization techniques such as the fast current interrupt technique (FCI). The actual thickness of lithium skin required is obviously determined by the surface area of the anode and the quantity of carbonaceous material serving as the cathode.

The idealized recharge chemical reactions for some of the electrochemical cells described in U.S. Pat. No. 4,877,695 are as follows:
$2C^-_6 Li^+ - e^- \rightarrow 2C_6 + 2Li^+$ cathode
$NaBF_4 + KBF_4 + 2e^- \rightarrow NaK + 2BF_4^-$ anode
$2Li^+ + 2BF_4^- \rightarrow 2LiBF_4$ electrolyte The data presented in Table I shows that these reactions do indeed occur. However, due to the lower solubility of $KBF_4$, recharging of the cell results in the deposition of lithium metal onto the sodium/potassium eutectic surface. The deposition of the lithium metal skin on the sodium/potassium eutectic did not however result in the usual polarization problems encountered when working with lithium electrodes under high current drains. Accordingly, this process could be utilized prior to discharge of the cell with the result that less volume and weight of electrolyte could be used to satisfy the stoichiometry of the cell reactions. This will result in significantly improved energy and power density values for the cell.

The principles, preferred embodiments and modes of operation of the present invention have been described in the foregoing specification. The invention which is intended to be protected herein, however, is not to be construed as limited to the particular form disclosed, since these are to be regarded as illustrative rather than restrictive. Variations and changes may be made by those skilled in the art without departing from the spirit of the invention.

What is claimed is:

1. A non-aqueous electrochemical cell comprising an anode, a cathode and a non-aqueous electrolyte, said anode comprising a substrate having a mixture of at least two elements selected from the group consisting of sodium, potassium, cesium and rubidium, and said anode having a skin or coating of an alkali metal.

2. The electrochemical cell of claim 1 wherein said skin or coating comprises lithium.

3. The electrochemical cell of claim 1 wherein said skin or coating consists of at least two alkali metals, one of said alkali metals being lithium and comprising at least 75% by weight of said skin or coating.

4. The electrochemical cell of claim 1 wherein said cathode comprises an electrically conductive carbonaceous material.

5. The electrochemical cell of claim 1 wherein said anode comprises a mixture of sodium and potassium.

6. The electrochemical cell of claim 1 wherein said non-aqueous electrolyte comprises:
   1) a solvent, and
   2) an electrolyte salt selected from the group consisting of an alkali metal tetrafluoroborate, tetraalkyl ammonium tetrafluoroborate.

7. The electrochemical cell of claim 6, wherein said electrolyte comprises an alkali salt of tetrafluoroborate.

8. The electrochemical cell of claim 7, wherein said electrolyte salt comprises a compound selected from the group consisting of lithium tetrafluoroborate, sodium tetrafluoroborate and potassium tetrafluoroborate.

9. The electrochemical cell of claim 6, wherein said electrolyte salt comprises tetraalkyl ammonium tetrafluoroborate.

10. The electrochemical cell of claim 6, wherein said electrolyte salt is selected from the group consisting of tetraethylammonium tetrafluoroborate and tetrabutylammonium tetrafluoroborate.

11. The electrochemical cell of claim 6, wherein said solvent comprises compounds selected from the group consisting of ethylene carbonate, propylene carbonate, $\gamma$-butyrolactone, diglyme, 1,3-dioxolane, 1,2-dimethoxyethane, 2-methyl tetrahydrofuran, and mixtures thereof.

12. The electrochemical cell of claim 1, wherein said carbonaceous material comprises activated carbon fibers.

13. The electrochemical cell of claim 1, wherein said anode is supported on an electrically conductive metal substrate.

14. In a non-aqueous electrochemical cell comprising an anode, a carbonaceous cathode and a non-aqueous electrolyte, the improvement wherein said anode comprises a substrate having a mixture of at least two elements selected from the group consisting of sodium, potassium, cesium and rubidium, and said anode having a skin or coating comprising lithium.

15. The electrochemical cell of claim 14, wherein said anode is a molten mixture of sodium and potassium.

16. The electrochemical cell of claim 14, wherein said electrolyte comprises:
   1) a solvent, and
   2) an electrolyte salt selected from the group consisting of an alkali metal tetrafluoroborate and a tetraalkyl ammonium tetrafluoroborate.

17. A process for preparing a skin or coating of an alkali metal on an anode comprising a substrate having a mixture of at least two elements selected from the group consisting of sodium, potassium, cesium and rubidium which comprises the steps of forming an electrochemical cell with said anode, covering said anode with an alkali metal, providing said cell with a solvent and an electrolyte salt selected from the group consisting of an alkali metal tetrafluoroborate and tetraalkyl ammonium tetrafluoroborate, and then charging said cell.

18. The process of claim 17 wherein said alkali metal comprises lithium.

19. A process for preparing a skin or coating of an alkali metal on an anode comprising a substrate having a mixture of at least two elements selected from the group consisting of sodium, potassium, cesium and rubidium which comprises the steps of forming an electrochemical cell with said anode and an alkali metal containing electrolyte, charging said cell and then replacing the electrolyte with an electrolyte comprising a solvent and an electrolyte salt selected from the group consisting of an alkali metal tetafluoroborate and tetraalkyl ammonium tetrafluoroborate.

* * * * *